United States Patent [19]

Ellozy et al.

[11] Patent Number: 5,649,060
[45] Date of Patent: Jul. 15, 1997

[54] AUTOMATIC INDEXING AND ALIGNING OF AUDIO AND TEXT USING SPEECH RECOGNITION

[75] Inventors: Hamed A. Ellozy, Bedford Hills; Dimitri Kanevsky, Ossining; Michelle Y. Kim, Scarsdale; David Nahamoo; Michael Alan Picheny, both of White Plains; Wlodek Wlodzimierz Zadrozny, Mohegan Lake, all of N.Y.

[73] Assignee: International Business Machines Corporation, Armonk, N.Y.

[21] Appl. No.: 547,113

[22] Filed: Oct. 23, 1995

Related U.S. Application Data

[63] Continuation of Ser. No. 138,949, Oct. 18, 1993, abandoned.

[51] Int. Cl.[6] .................................................. G10L 9/00
[52] U.S. Cl. .................. 395/2.87; 395/2.6; 395/2.44; 395/2.85; 395/752; 395/759; 369/25
[58] Field of Search ........................... 395/2.4, 2.44, 395/2.55, 2.59, 2.6, 2.64, 2.79, 2.84, 2.85, 2.86, 2.87; 369/25; 364/419.02, 419.08

[56] References Cited

U.S. PATENT DOCUMENTS

| | | | |
|---|---|---|---|
| 4,682,957 | 7/1987 | Young | 434/307 |
| 4,689,022 | 8/1987 | Peers et al. | 434/307 |
| 4,695,975 | 9/1987 | Bedrij | 364/900 |
| 4,783,803 | 11/1988 | Baker et al. | 395/2.45 |
| 4,847,698 | 7/1989 | Freeman | 358/343 |

(List continued on next page.)

FOREIGN PATENT DOCUMENTS

| | | | |
|---|---|---|---|
| 0507743A2 | 2/1992 | European Pat. Off. | G11B 27/028 |
| 61-084174 | 4/1986 | Japan . | |
| PCT/US91/ 09536 | 12/1991 | WIPO | G11B 17/32 |

OTHER PUBLICATIONS

Bahl, L.R., et al. "A Maximum Likelihood Approach to Continuous Speech Recognition." *IEEE Transactions on Pattern Analysis and Machine Intelligence*, vol. PAMI-5, No. 2, pp. 179-190, Mar. 1983.

Brown, P.F., et al. "Aligning Sentences In Parallel Corpora." .us on;Proceedings 29th Annual Meeting of the Association for Computational Linguistics, Berkeley, Calif., Jun. 1991, pp. 169-176.

de Souza, P.V. "A Statistical Approach to the Design of an Adaptive Self-Normalized Silence Detector." *IEEE Transactions on Acoustics, Speech, and Signal Processing*, vol. ASSP-31, No. 3, Jun. 1983, pp. 678-684.

Leung, H.C., et al. "A Procedure For Automatic Alignment of Phonetic Transcriptions With Continuous Speech." *Proceedings of ICASSP 84*, 1984, pp. 2.7.1 to 2.7.3.

IBM Technical Disclosure Bulletin, Mar. 1991, vol. 33, #10A, pp. 295-296, "Correlating Audio and Moving-Image Tracks".

*Primary Examiner*—Allen R. MacDonald
*Assistant Examiner*—Michael A. Sartori
*Attorney, Agent, or Firm*—Whitham, Curtis, Whitham and McGinn; Robert P. Tassinari, Jr.

[57] ABSTRACT

A method of automatically aligning a written transcript with speech in video and audio clips. The disclosed technique involves as a basic component an automatic speech recognizer. The automatic speech recognizer decodes speech (recorded on a tape) and produces a file with a decoded text. This decoded text is then matched with the original written transcript via identification of similar words or clusters of words. The results of this matching is an alignment of the speech with the original transcript. The method can be used (a) to create indexing of video clips, (b) for "teleprompting" (i.e. showing the next portion of text when someone is reading from a television screen), or (c) to enhance editing of a text that was dictated to a stenographer or recorded on a tape for its subsequent textual reproduction by a typist.

8 Claims, 7 Drawing Sheets

U.S. PATENT DOCUMENTS

| | | | |
|---|---|---|---|
| 4,884,972 | 12/1989 | Gasper | 434/185 |
| 4,984,274 | 1/1991 | Yahagi et al. | 381/43 |
| 5,010,495 | 4/1991 | Willetts | 364/513 |
| 5,027,406 | 6/1991 | Roberts et al. | 395/2 |
| 5,111,409 | 5/1992 | Gasper et al. | 395/152 |
| 5,119,474 | 6/1992 | Beitel et al. | 395/154 |
| 5,136,655 | 8/1992 | Bronson | 381/41 |
| 5,145,375 | 9/1992 | Rubio | 434/157 |
| 5,149,104 | 9/1992 | Edelstein | 273/434 |
| 5,199,077 | 3/1993 | Wilcox et al. | 381/43 |
| 5,272,571 | 12/1993 | Henderson et al. | 360/4 |
| 5,333,275 | 7/1994 | Wheatley et al. | 395/2.4 |

AUTOMATIC INDEXING AND ALIGNING OF AUDIO AND TEXT USING SPEECH RECOGNITION

CROSS-REFERENCE TO RELATED APPLICATION

This application is a continuation of application Ser. No. 08/138,949 filed Oct. 18, 1993, now abandoned.

BACKGROUND OF THE INVENTION

This invention relates generally to a system for indexing of audio or audio-video recordings and textual data, for example aligning texts that are stored in computer files with corresponding data that stored on audio-video media, such as audio tape, video tape, or video disk. The typical problem in this area can be formulated as follows.

Consider an audio-video recording and its written transcript. To index the video, it is necessary to know when words appearing on the transcript were spoken. To find an appropriate part of the recording, we need a text-speech index containing data pairs for each word in the transcript. Each data pair consists of a word in the transcript and the f-number describing the position of the word on the tape. Each data pair can be represented as (word, f-number).

We will use the term "word" to refer both to single words such as "dog", "step", or "house", and to phrases such as "United States of America" "production of wheat", etc.

Indexing an audio-video recording by text enhances one's ability to search for a segment of the audio recording. It is often faster to manually or automatically search for a segment of text than it is to search for a segment of audio recording. When the desired text segment is found, the corresponding audio recording can be played back.

Indexing an audio recording by text also enhances one's ability to edit the audio recording. By moving or deleting words in the text, the corresponding audio segments can be moved or deleted. If there is maintained a vocabulary of stored words and stored audio segments corresponding to the words, then when words are inserted in the text, the corresponding audio segments can be inserted in the audio recording.

Two example applications where it is necessary to align speech with a corresponding written transcript are (1) providing subtitles for movies, and (2) fast retrieval of audio-video data recorded at trial from a stenographic transcript by an appellate court or a deliberating jury.

A conventional approach to align recorded speech with its written transcript is to play back the audio data, and manually select the corresponding textual segment. This process is time consuming and expensive.

Other work deals with relationships (or synchronization) of speech with other data (e.g. facial movements) that are time aligned. For example U.S. Pat. No. 5,136,655 (Bronson) discloses the indexing of different data (words and animated pictures). There, the files with aligned words and pictures were obtained by a simultaneous decoding of voice by an automatic speech recognizer and of time aligned video data by an automatic pattern recognizer. In another example, U.S. Pat. No. 5,149,104 (Edelstein), audio input from a player is synchronized with a video display by measuring the loudness of a speaker's voice.

While these methods provide some kind of automatic annotation of audio-video data they are still not well suited for indexing of stored speech and textual data that are not time correlated.

SUMMARY OF THE INVENTION

It is an object of the invention to automatically map an index text to corresponding parts of an audio or audio/video recording.

According to the invention, an apparatus for indexing an audio recording comprises an acoustic recorder for storing an ordered series of acoustic information signal units representing sounds generated from spoken words. The acoustic recorder has a plurality of recording locations. Each recording location stores at least one acoustic information signal unit.

The indexing apparatus further includes a speech recognizer for generating an ordered series of recognized words having a high conditional probability of occurrence given the occurrence of the sounds represented by the acoustic information signals. Each recognized word corresponds to at least one acoustic information signal unit. Each recognized word has a context of at least one preceding or following recognized word.

A text storage device stores an ordered series of index words. The ordered series of index words comprises a visual representation of at least some of the spoken words represented by the acoustic information signal units. Each index word has a context of at least one preceding or following index word.

Means are provided for comparing the ordered series of recognized words with the ordered series of index words to pair recognized words and index words which are the same word and which have matching contexts. Each paired index word is tagged with the recording location of the acoustic information signal unit corresponding to the recognized word paired with the index word.

In one aspect of the invention, each recognized word comprises a series of one or more characters. Each index word comprises a series of one or more characters. A recognized word is the same as an index word when both words comprise the same series of characters.

The context of a target recognized word may comprise, for example, the number of other recognized words preceding the target recognized word in the ordered series of recognized words. The context of a target index word may comprise, for example, the number of other index words preceding the target index word in the ordered series of index words. The context of a recognized word matches the context of an index word if the context of the recognized word is within a selected threshold value of the context of the index word.

In another aspect of the invention, each index word which is not paired with a recognized word has a nearest preceding paired index word in the ordered series of index words, and has a nearest following paired index word in the ordered series of index words. The comparing means tags a non-paired index word with a recording location between the recording location of the nearest preceding paired index word and the recording location of the nearest following paired index word.

Preferably, the speech recognizer aligns each recognized word with at least one acoustic information signal unit.

In a further aspect of the invention, each recognized word which is not paired with an index word has a nearest preceding paired recognized word in the ordered series of recognized words, and has a nearest following paired recognized word in the ordered series of recognized words. The context of a target recognized word comprises the number of other recognized words preceding the target recognized word and following the nearest preceding paired recognized word in the ordered series of recognized words. The context of a target index word comprises the number of other index words preceding the target index word and following the nearest preceding paired index word in the ordered series of index words. The context of a recognized word matches the context of an index word if the context of the recognized word is within a selected threshold value of the context of the index word.

DESCRIPTION OF THE PREFERRED EMBODIMENTS

Figure 1:
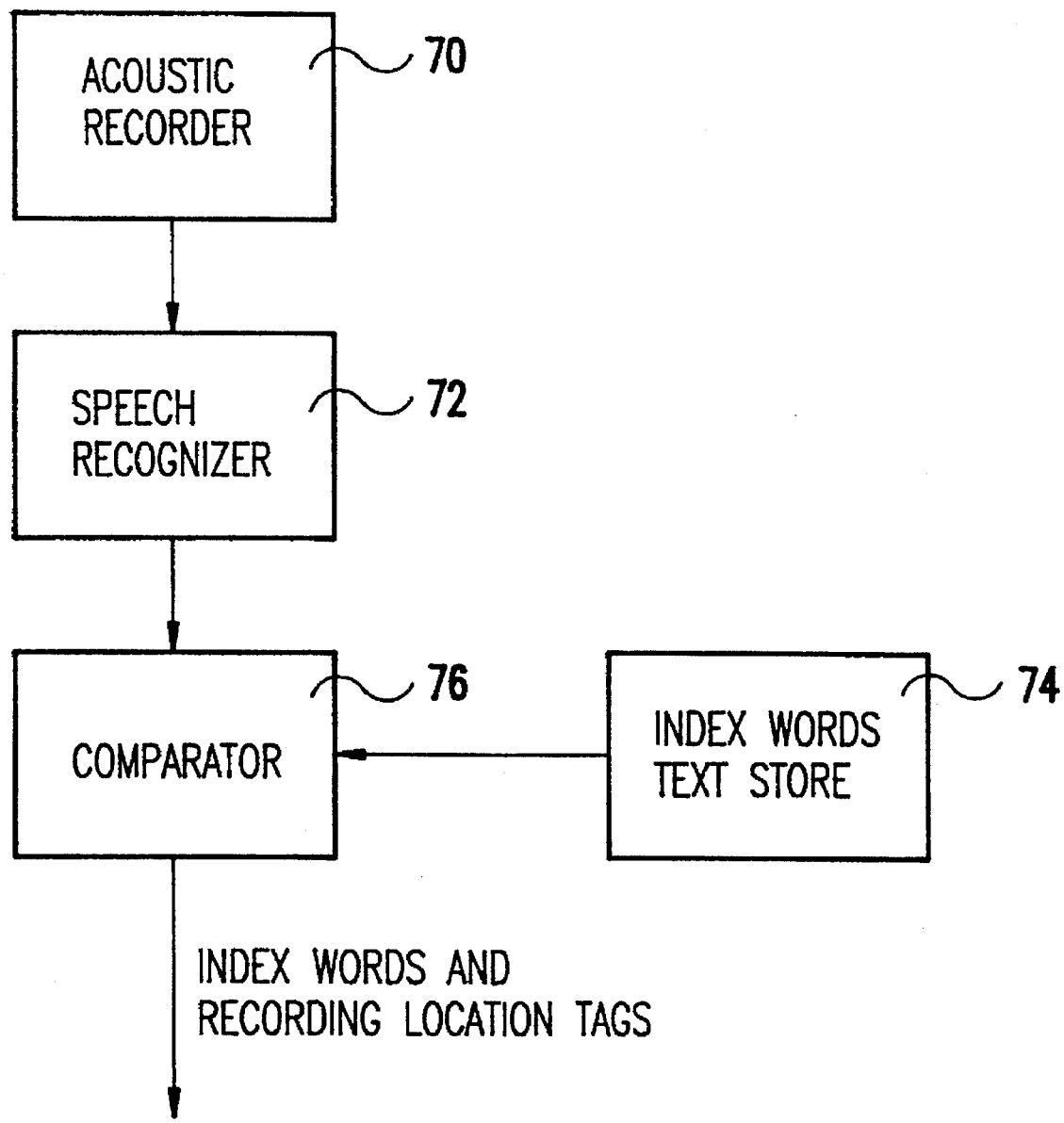
FIG. 1 is a block diagram of an example of an apparatus for indexing an audio recording according to the invention.
Figure 7:
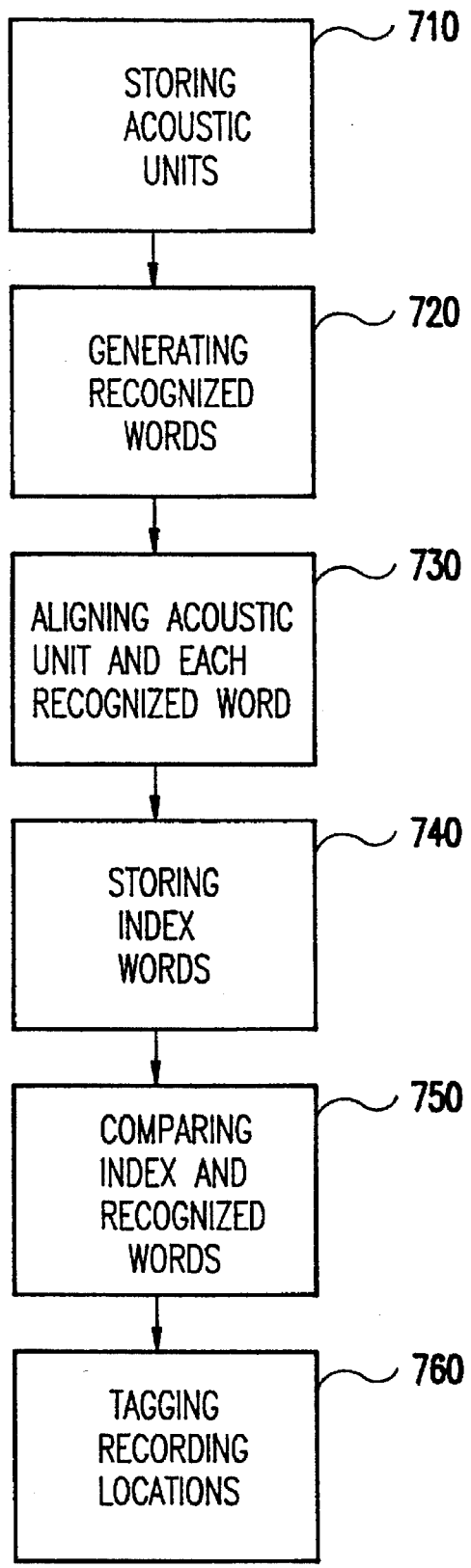
FIG. 7 is a general flow diagram of the method of the present invention.

FIG. 1 is a block diagram of an example of an apparatus (and steps 710–760 of FIG. 7 are an example of a method) for indexing an audio recording according to the invention. The apparatus comprises an acoustic recorder 70 for storing an ordered series of acoustic information signal units representing sounds generated from spoken words. The acoustic recorder has a plurality of recording locations. Each recording location stores at least one acoustic information signal unit.

The acoustic recorder 70 may be, for example, a magnetic tape or disk storage unit for a computer system.

The indexing apparatus further comprises a speech recognizer 72 for generating an ordered series of recognized words having a high conditional probability of occurrence given the occurrence of the sounds represented by the acoustic information signals. Each recognized word corresponds to at least one acoustic information signal unit. Each recognized word has a context of at least one preceding or following recognized word.

The speech recognizer 72 may be a computerized speech recognition system such as the IBM Speech Server Series.

A text storage device 74 is provided for storing an ordered series of index words. The ordered series of index words comprises a visual representation of at least some of the spoken words represented by the acoustic information signal units. Each index word has a context of at least one preceding or following index word.

The text storage device 74 may be, for example, a magnetic tape or disk storage unit for a computer system.

Finally, the indexing apparatus further comprises a comparator 76 for comparing the ordered series of recognized words with the ordered series of index words to pair recognized words and index words which are the same word and which have matching contexts. The comparator 76 also tags each paired index word with the recording location of the acoustic information signal unit corresponding to the recognized word paired with the index word. The comparator 76 may be, for example, a suitably programmed digital signal processor.

Each recognized word and each index word comprises a series of one or more characters. The comparator 76 determines that a recognized word is the same as an index word when both words comprise the same series of characters.

The context of a target recognized word may, for example, comprise the number of other recognized words preceding the target recognized word in the ordered series of recognized words. The context of a target index word may, for example, comprise the number of other index words preceding the target index word in the ordered series of index words. The context of a recognized word matches the context of an index word if the context of the recognized word is within a selected threshold value of the context of the index word.

Each index word which is not paired with a recognized word has a nearest preceding paired index word in the ordered series of index words, and has a nearest following paired index word in the ordered series of index words. The comparator 76 may tag a non-paired index word with a recording location between the recording location of the nearest preceding paired index word and the recording location of the nearest following paired index word.

In order to correlate each recognized word with at least one acoustic information signal unit, the speech recognizer preferably aligns each recognized word with at least one acoustic information signal unit.

Each recognized word which is not paired with an index word has a nearest preceding paired recognized word in the ordered series of recognized words, and has a nearest following paired recognized word in the ordered series of recognized words.

In one embodiment of the invention, the context of a target recognized word may, for example, comprise the number of other recognized words preceding the target recognized word and following the nearest preceding paired recognized word in the ordered series of recognized words. The context of a target index word may, for example, comprise the number of other index words preceding the target index word and following the nearest preceding paired index word in in the ordered series of index words. The context of a recognized word matches the context of an index word if the context of the recognized word is within a selected threshold value of the context of the index word.

Figure 2:
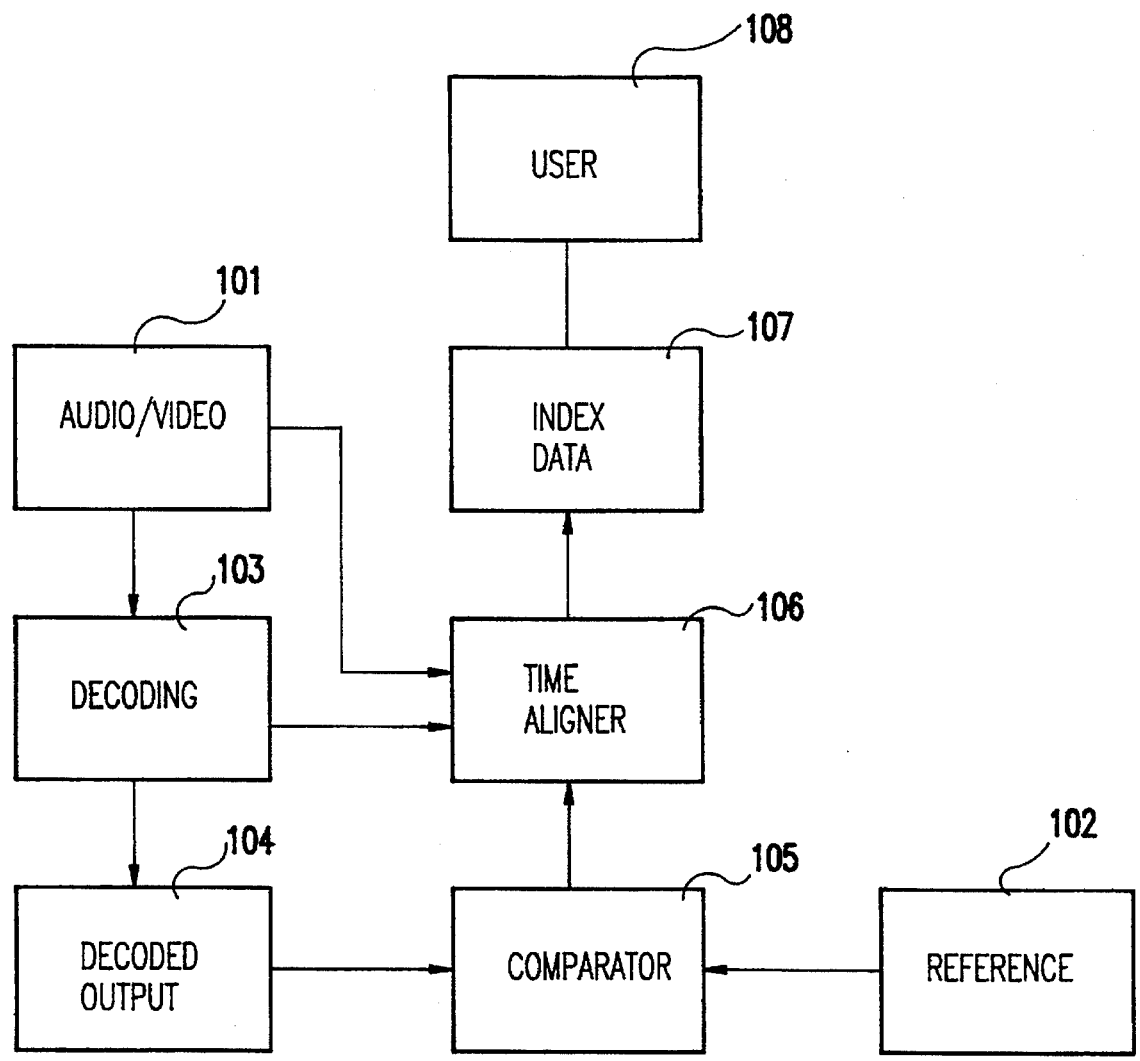
FIG. 2 is a block diagram on how procedures and data in the proposed invention are related.

FIG. 2 describes schematically procedural modules and data entries. Main entry data in this process are audio/video data 101 that enter the decoding module (automatic speech recognizer) 103 and the reference transcript data 102. The reference transcript data 102 represent the text (exact or approximate) of the audio data in audio/video data 101. The audio data is processed by decoding module 103 and a decoded output (recognized words) 104 is produced. The decoding module 103 may be a computerized speech recognition system such as the IBM Speech Server Series (trademark) or the IBM Continuous Speech Series (trademark).

The decoded output 104 and the reference transcript 102 are matched in the comparing module 105. All words in the decoded output 104 are time stamped by time aligner 106 while the audio data is decoded in 103. The same time stamps are provided for the corresponding words in reference transcript 102. The time stamped reference transcript 102 is used to form index data 107. A user 108 can utilize the indexing to retrieve and play back selected recorded audio/video data.

Figure 3:
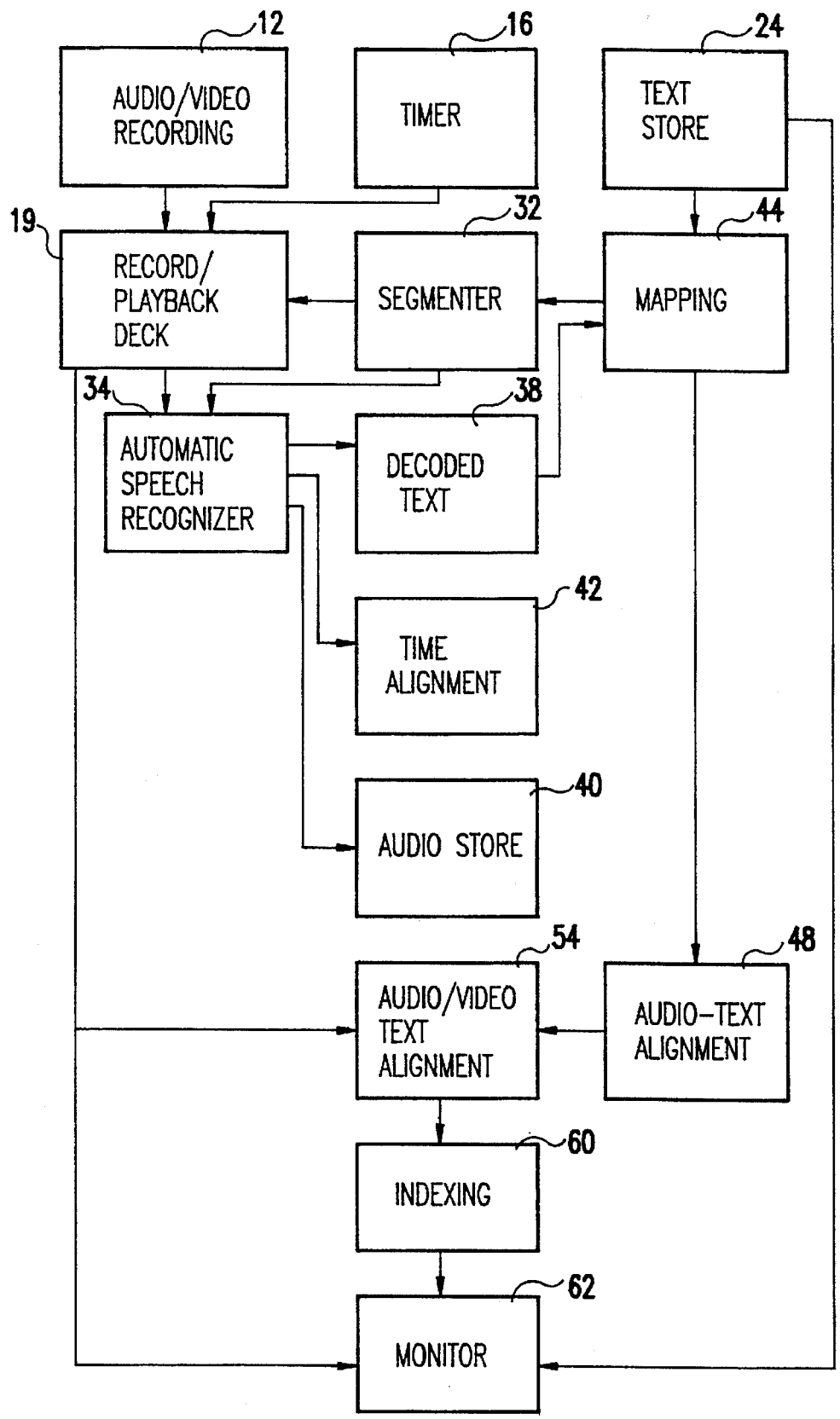
FIG. 3 is a block diagram of an example of a system for automatic aligning text and audio/video recordings.

FIG. 3 is a block diagram of an example of a system for automatic aligning text and audio/video recordings.

The system of FIG. 3 comprises a recording medium 12 which stores at least audio data. Recording medium 12 may also store, for example, video data. The audio or audio-video data may be recorded as either analog or digital signals.

A text store 24 contains a transcript of the text of the speech contained in the audio data on recording medium 12. Transcripts may be produced, for example, by a typist who reproduces a text by listening to the audio recording and typing the words spoken therein. Alternatively, the text may be typed (for example by a stenographer) at the same time the audio is recorded. Instead of typing, the text may be produced using an automatic handwriting recognizer, or a speech recognizer trained to the voice of a speaker who listens to the audio recording and redictates the words spoken therein.

In the conventional approach for replaying a preselected portion of audio-video data recording 12, the audio-video data would typically be monitored while being recorded or while being retrieved after earlier storage, e.g. on a record/ playback deck 19 connected to a monitor 62. In such a conventional approach the transcript would also be viewed on the monitor 62 that is connected with the text store 24. In this conventional approach the transcript is manually aligned with the video-audio data recording 12.

In the present invention the audio data is processed via an automatic speech recognizer (ASR) 34 that is connected with the record/playback deck 19. The output of the ASR 34 is the decoded text 38. This decoded text is time-aligned with the audio data that is stored in 40 (and that is the same as a corresponding portion of audio-data on recording medium 12).

Notice that the audio data is used several times. First, the audio data is passed to the decoder. Second, a part of the audio data is aligned with the decoded text. FIG. 3 shows that part of the audio data is used for alignment in the decoded block.

For this purpose the audio data from the main storage in 12 should be copied to temporary storage 40 for the purpose of aligning it with the text.

This time-alignment is obtained by the following operations.

First, the audio data is time stamped while it is being recorded on deck 19. This time stamping is done by timer 16, and represents the recording location of the audio data. For example, if the audio data is divided into frames of 10 milliseconds duration, then the frames are sequentially time stamped with numbers N/100 seconds, where N is a positive integer. Alternatively, if the audio recording is made on magnetic recording tape, the time stamp for an audio segment may represent the length of the recording tape from the start of the recording to the audio segment.

Secondly, the time stamped audio data provides a basis for time stamping of decoded words. For this purpose, the time stamped data is passed to automatic speech recognizer 34 and stored in 40. The procedure of time stamping of decoded words in the text 38 is done by the time-alignment device 42. It works according to the following algorithms.

(Algorithm A) The identification of the probable beginning and end of a speech segment F that corresponds to the i-th part of the whole text—Ti.

This identification is performed in two steps.

(1) Let $T1, T2, \ldots, Ti, \ldots$ partition the whole text. The input is an i-th speech segment F (that is stored in 40) and the decoded text Ti is output by automatic speech recognizer 34. Ti is produced by the ASR 34 when it decodes the audio recording segment F. The decoded text Ti is the text that maximizes the likelihood score Prob(Ti|F), where Prob(Ti|F) is the conditional probability of decoded text Ti given the occurrence of the recorded audio segment F.

Let the speech segment F be given as a collection of frames $F1, F2 \ldots : F=\{F1, F2, F3, \ldots, Fk\}$. Each frame may be, for example, of 10 milliseconds duration. An acoustic information signal unit consists of one or more recorded frames. Therefore, each decoded word corresponds to one or more recorded frames.

(2) A set of candidate frames $F(k-1), F(k-2), \ldots, F(k+1), F(k+2)$, near $F(k)$ are considered to find the most like $F(k)$, near $F(k)$ are considered to find the most like beginning of the first word W in the text. The most like candidate frames Fr can be chosen as those that give the largest value for the following expression $P=Prob(Fr, F(r+1), \ldots, F1|W)/N1$ where N1 is a normalized factor (to ensure that we have functions with peaks), and frames Fr are chosen close to the frame Fk found in the previous step, and for each fixed frame Fr, the frame F1 is chosen as those for which the expression P has the pick as the function of 1.

This time alignment in both steps can be done efficiently using the Viterbi alignment. (See, for example, L. R. Bahl, F. Jelinek, R. L. Mercer "A Maximum Likelihood Approach to Continuous Speech Recognition", *IEEE Transactions on Pattern and Machine Intelligence*, Vol. PAMI-5, March 1983, pages 179–190.)

This algorithm could also use some criteria for rejecting bad alignments, i.e. alignments that produce low likelihood scores for all possible candidate words for a considered list of speech segments. In such a case, the alignment should be done only for those parts that give good likelihood scores. Parts of the audio that were rejected by this criteria could be time stamped from other considerations as taking into account the length of words, relative speed of speaking, etc. If 'rejected' intervals are relatively short, then these mechanical methods give good approximation for time stamping of each word in the text. Also one can iteratively continue refining the segmentation of the frame string given a decoded text. That is, given a speech segment, decode the text. Then, given the decoded text, redefine the speech segment by identifying the most probable beginnings and endings of the decoded words. The process can then be repeated with the redefined speech segment.

In the present invention, another variant of the mode of operation of the automatic speech recognizer 34 is possible. Namely, the automatic speech recognizer may receive information about the content of the text store 24 from mapping block 44. This content defines the part and size of a tape to be played to the automatic speech recognizer 34 and affects the decoding as described in FIG. 4 below.

The reference transcript in text store 24 constrains the work of automatic speech recognizer 34 by determining the set of possible sentences. The size of the reference text also determines the maximum size of a speech segment to be considered—not longer than the number of words in text Ti times the average number of frames in long words.

In the present invention, the decoded text 38 and the transcript in text store 24 are provided to a mapping module 44. In the mapping module the decoded text and the transcript are matched according to the block scheme of FIG. 3 (described below).

The aligned decoded text 38 and reference in text in store 24 from the mapping module 44 are passed to the block 48.

In the block 48, the audio data is aligned against the reference transcript. This alignment is obtained by the alignment of audio data with the decoded text 38 (as described in more detail in FIG. 4 below).

In the next step, the aligned audio-transcript data passes to the block 54 where the aligned audio-transcript data is aligned against the video data 12. This video data 12 is received from the deck 19. The alignment of video data with audio-transcript data is done in accordance with timing information about audio and video data (which was produced by the timing block 16). As mentioned above, this information is stored on the tape 19.

The whole aligned audio-video-transcript data from the block 54 goes to the indexing block 60 where the indexing is done in accordance with the transcript in text store 24 by choosing key words or phrases. The indexing data in 60 can be monitored and retrieved from the monitor 62. Monitor 62 may be a computer terminal through which a user can read text, watch a video, hear audio, or manipulate the observed information.

The work of the decoder 34 is controlled by the segmentation block 32. The block 32 receives control parameters from the mapping block 44. These parameters include the size of the text, grammatical structures for the text, etc. These parameters are used to determine (1) the size of speech segment from 19 to be passed to the decoder 34, and (2) dictionary and grammar constraints.

This completes the description of the indexing of the audio-video data by the transcript data in accordance with FIG. 3.

Figure 4:
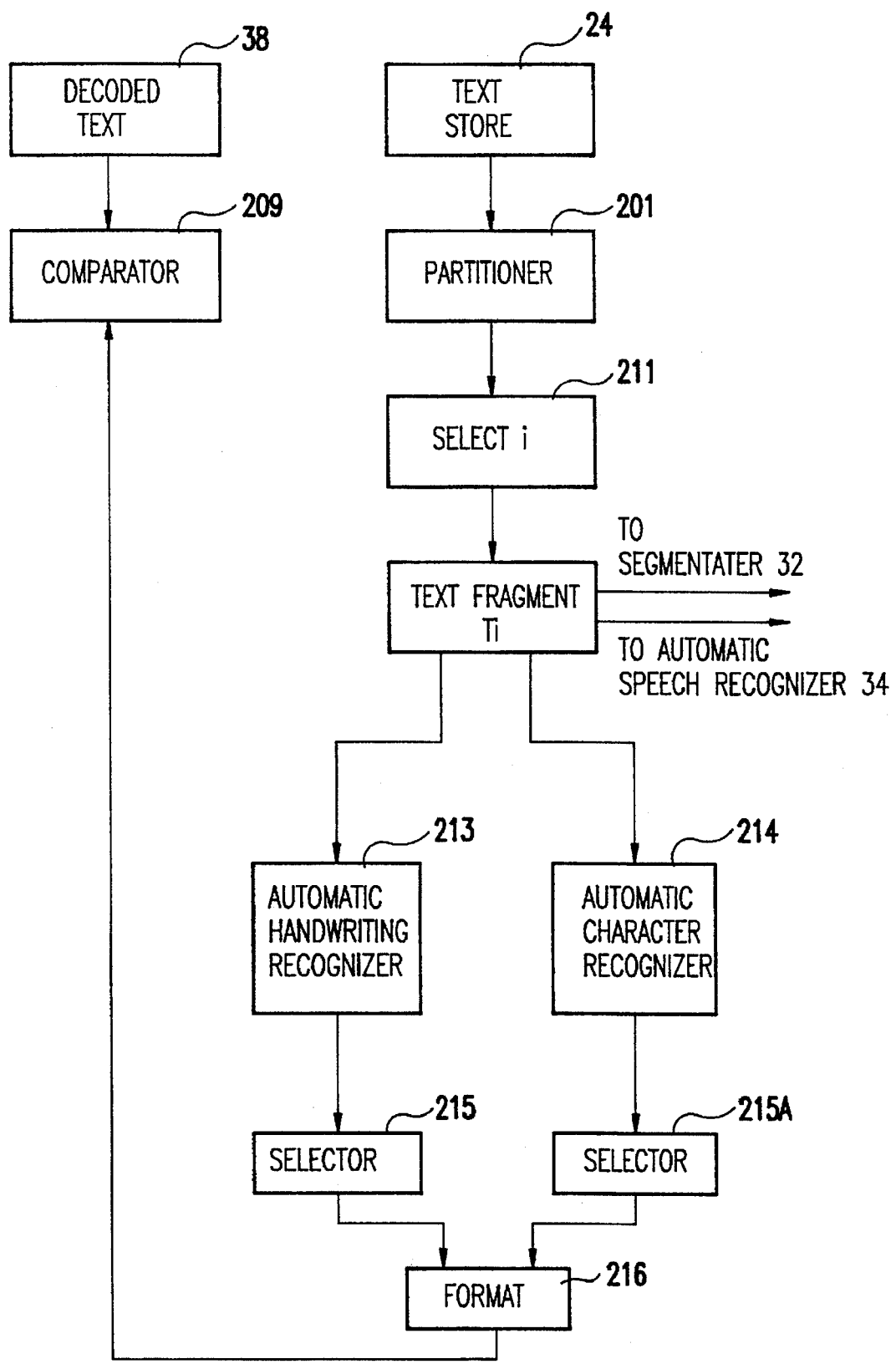
FIG. 4 is a block diagram of an example of the mapping module of FIG. 3.

Next comes the description of the mapping block 44 in FIG. 4. The mapping block 44 receives as input data a transcript 24 and a decoded text 38 (FIG. 3). The transcript 24 goes to the block 201 where it is partitioned into texts of smaller sizes Ti (i=1, 2, ..., k). Each partition may be, for example, a sequence of 10–15 words. If the decoder 34 is designed to handle a large vocabulary, each partition may be 100–1000 words. Preferably, partitions end on a period or other indication of the end of a sentence, to avoid splitting a sentence among two partitions. After this operation, the work is performed as follows. The parameter i in the block 211 starts with the initial value i–1. The text T1 is copied to the block 202 and processed as described below. The successive fragments T2, ..., Ti, ... are processed in the same manner. (After the alignment of Ti with the corresponding part of the tape is finished, the value of i is increased by 1 and the procedure is performed for the T(i+1).)

After text Ti is copied to the block 202 it can be processed with one of the following options.

1) If the text is handwritten, it is passed to the automatic handwriting recognizer 213, where it is decoded, and the decoded text is sent to the selection block 215 together with confidence scores. These scores reflect the likelihood of handwritten strokes being correctly decoded. There are many different methods for computing confidence scores. For example, given handwritten strokes HW, there are a few candidates W1, W2, W3, which the search for the best match is conducted. Let L(W1,HW), L(W2,HW, ... ), ... be likelihood scores that measure a degree of match of the strokes HW to words W1, W2, ..., respectively. Then the sharpness of the normalized peak at the maximum likelihood score could represent the level of confidence that the handwritten strokes are decoded correctly.

In the selector block 215 words with confidence scores higher than a predetermined threshold are selected, and numbered in accordance with their place in the handwritten transcript. All this information is sent to the format block 216 where the following operations are performed.

a) The words are marked with labels representing information about their places in the transcript. The set of (word, label) pairs are formatted in block 216 (for example, in ASCII), and the formatted information is sent to the comparison block 209. In this comparison block 209, the transcript words (index words) will be compared with the formatted decoded text 38 received from automatic speech recognizer 34.

b) The information about the size of the list Ti (either approximate or exact number of words or lines in the file containing Ti) is sent to the segmenter block 32 (FIG. 3). The transcript Ti is sent to the automatic speech recognizer 2) If the transcript in text store 24 was produced by scanning typed materials (e.g. books, faxes etc.), the transcript file is sent to an automatic character recognizer (OCR) in block 214. Decoded output from 214 block (decoded words, confidence scores) is sent to the selection block 215A with a similar procedure as described in 1) above.

3) The transcript is represented in a format such as ASCII or BAUDOT characters. In this case, the transcript is sent to the format block 216 and then is processed as in case 1).

The following is the description of the procedure in the block 209. This block receives recursively the decoded text DTi that corresponds to the text Ti. The decoded text DTi aligned against its reference text Ti (starting recursively from i–1).

There are three main cases as this alignment is done.

Case 1: The transcript Ti is an exact representation of the recorded speech.

In this case, words in DTi are considered 'correct' if they coincide with words in Ti that have the same context (occur approximately in the same 'places') as corresponding words in DTi. In order to define whether two equal words have the same context (occur in the same 'place'), one can proceed as follows.

1) Words in Ti and DTi can be enumerated. Say, words in DTi are numbered as DW1, DW2, ... as they appear in the text. Similarly, words in the text Ti can be numbered as W1, W2, W3 ... words DWi and Wj could be considered as approximately at the same place if $|j-i|<d$ where the threshold value d is a small number (say, 3 or 4). If the words DWi and Wj are approximately at the same place and are equal (i.e. are the same character strings) then they could be considered as matched.

2) Use the methods that are described in the paper by P. F. Brown, et al entitled "Aligning Sentences in Parallel Corpora", (*Proceedings 29th Annual Meeting of the Association for Computational Linguistics*, Berkeley, Calif., 1991, pages 169–176.)

The first algorithm can be improved as follows.

a) If words DWi and Wj that are equal (as strings of characters) have large length (defined as number of characters), then the distance $d=|i-j|$ can be comparatively large (say, d=5 or 6). At the same time, if these words are short (for example DWi is 'a' or 'the') then d should be small (1 or 2).

b) If equal words DWi and Wj have low frequency of occurrence (that is measured as the frequency with which these words occur in large corpora of texts) then $d=|i-j|$ can be chosen larger. On the other hand, if DWi–Wi are very frequent words (like 'a', 'it', 'no') then $d=|i-j|$ should be chosen smaller.

c) If pairs of words DW(i–1), DWi and W(j–1), Wj are equal then the difference $d=|i-j|$ can be chosen larger.

Similarly, if trigrams DW(i−2), DW(i−1), DWi and W(j−2) W(j−1)Wj are equal then d=|i−j| can be increased further. Similar increases in admissible values of d=|i−j| can be considered for other n-grams with increasing n.

d) Comparison of words in DTi with words in Ti is done only for those words in DTi that have confidence scores higher than some threshold. (Confidence scores of decoded words were discussed in 1) above).

3) Words in DTi can be indexed by acoustic frames during decoding (i.e. the beginning and end of each word in DTi correspond to some set of acoustic frames (see Algorithm A above). One can approximately align the text Ti against the string of frames by defining the average speed as the ratio of the number of words in Ti to number of frames on the tape used in dictating this text. Then the produce of this speed by the number of words preceding a given word defines its approximate relative place in the text.

4) Align the string of frames with a string of phonemes using known continuous speech recognition algorithms (e.g. H. C. Leung, V. W. Zue, "A Procedure For Automatic Alignment of Phonetic Transcriptions With Continuous Speech", *Proceedings of ICASSP* 84, pages 2.7.1–2.7.3, 1984). Match this phonetic string with the decoded text DTi via the correspondence with the acoustic frame string. Use rules (or a table) to produce a phonetic string for the reference text Ti. Then consider words in texts DTi and Ti as being in the same place if they are surrounded by similar phonetic substrings.

Case 2:

1. In this case the algorithm is similar to the algorithm in the case 1, except that some rules above are loosened.

The following are examples of modifications of the above algorithms.

a) Words from DTi and Ti are considered to be matched if they are approximately at the same place (in the sense of the definition in the sense of 2. above) and their length (i.e. number of characters from which they are composed) is large (e.g. 5 or 7). The exact length of words that are allowed to be compared depends on the level of approximation of the text Ti. The more Ti is an approximation of the recorded speech, the larger should be lengths of words required to obtain a match.

b) Insertions, omissions and changes in orders are allowed in comparison of n-grams of words like in c). For example, the trigram W(j−2)W(j−1)Wj in DTi can be matched against the five-gram V(j−3)V(j−2)V(j−1)VjV(j+1) from Ti if W(j−2)=V(j−3), W(i−1)=V(i−1) and Wi=Vi, and if matched words have sufficient lengths. In this example, the other words V(j−2) and V(j+1) from Ti could be considered as insertions.

Similarly, if n-grams in DTi and Ti are equal after interchanging the order of the words, then corresponding words could be considered as matched.

2. For each word segment in the speech data, compare the score of the aligned word from the provided script Ti with the score of a decoded word in DTi for that speech segment. Insert or replace the script word with the decoded word if the difference satisfies a specified threshold.

Case 3. Speech data and a summary script is available a) Identify words in DTi with high confidence scores (anchor points).

b) Align the anchor point sequence to the available summary script. In this case, the summary script and the speech data most often do not have time correlation. This is so, because, in preparing a summary, the author could rearrange the topics in the speech data at this discretion. To this effect, the summary will be broken into sentences and then all anchor points will be matched against all summary sentences. According to a threshold mechanism, an anchor point will be mapped to none, one, or many sentences. A sentence would also be mapped to none, one, or many anchor points. (A hidden Markov model for the production of summary sentences from anchor points using semantic similarity is trained and used for Viterbi alignment.)

c) Use the alignment result to break the summary into segments each associated with an anchor point. Since the anchor points carry time stamps, we achieve a time alignment between the summary script and the speech data.

d) Repeat this process on the subsegments that can still be broken into smaller parts.

Figure 5:
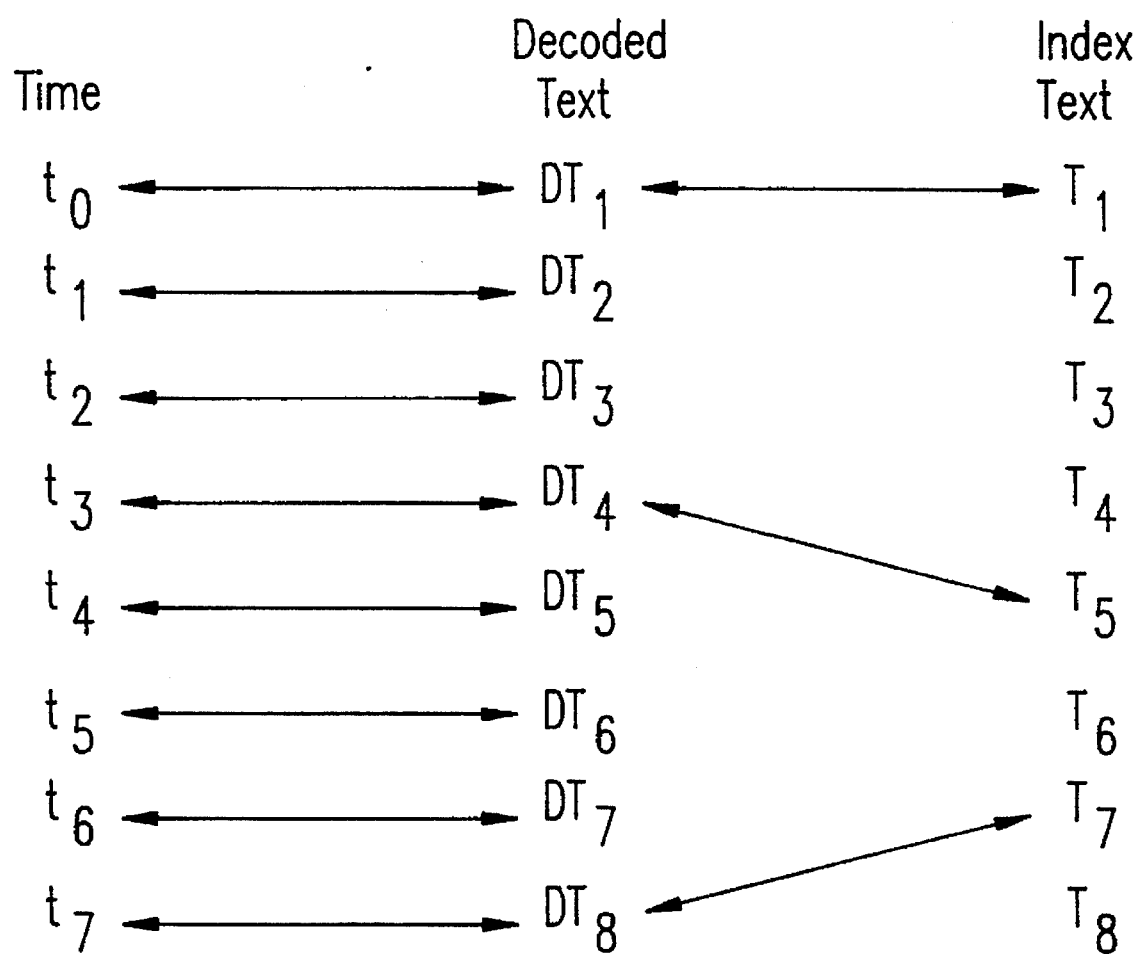
FIG. 5 schematically shows the alignment of audio/video data and decoded text data.

The following is an explanation of FIG. 5. The block 38 in FIG. 4 contains a decoded text (ordered series of recognized words) DT that is schematically represented by a vertical left series of words $DT_1, DT_2, DT_3, \ldots DT_8$ and a transcript T from block 216 in FIG. 4 that is schematically represented by a vertical right series of words $T_1, T_2, T_3, \ldots T_8$. The pairs of words $(DT_1, T_1)$, $(DT_4, T_5)$, $(DT_8, T_7)$ were matched as described in FIG. 4. The series of words $DT_1, DT_2, DT_3, \ldots DT_8$ is aligned against audio data in the course of decoding (FIG. 3 block 42). Let $(t_0, t_1), (t_1, t_2), \ldots (t_7, t_8)$ correspond to the beginnings and ends of words $DT_1, DT_2, \ldots DT_8$, respectively. Then the matched transcript words $T_1, T_5, T_7$ will correspond to time data $(t_0, t_1)$, $(t_3, t_1), \ldots (t_7, t_8)$, respectively (via the matched decoded words).

Remaining decoded words can be aligned with the time data by linear interpolation. For example, time segment $(t_1, t_3)$ corresponds to the word segment W2, W3, and can be aligned in accordance with the length of words. For example, if W2 consists of N phonemes and W3 of M phonemes, and $t=t_3-t_1$ then the segment $[t_1, t_1+t^*N/(N+M)]$ corresponds to W2, and the segment $[T1+^*N/(N+M), t_3]$ corresponds to W3.

The aligned transcript-audio data is transferred to the block 54 where is it aligned with video data from the record/playback deck 19 of FIG. 3. This alignment is obtained by time stamping that was done for audio-video data.

Figure 6:
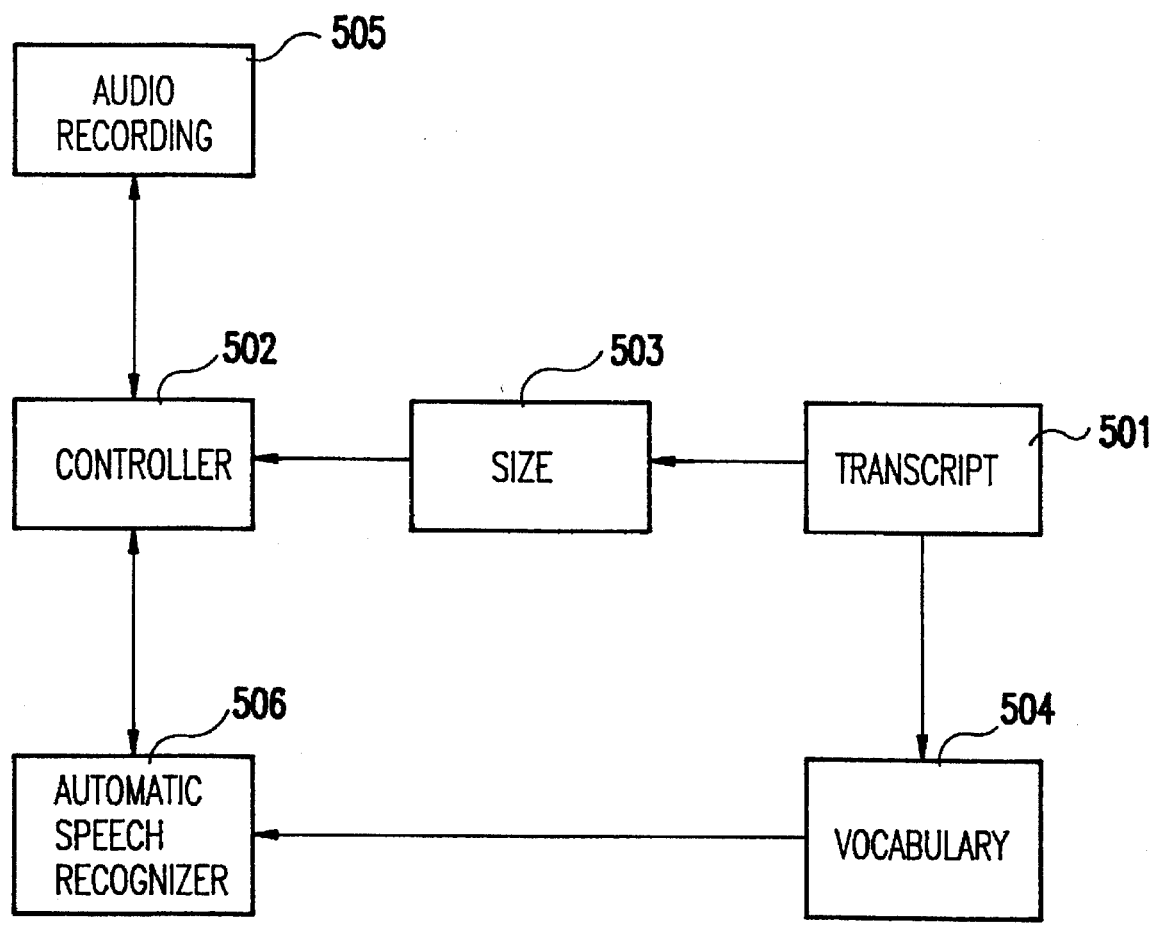
FIG. 6 schematically shows how the speech recognizer vocabulary may be obtained from segments of the text transcript.

The following is an explanation of FIG. 6 in which the speech recognizer vocabulary is obtained from segments of the text transcript. The block 501 contains the current part of a transcript Ti that is processed. This part of the transcript Ti is used to derive the vocabulary V 504 from which the text in Ti was formed, and the approximate size 503 of the tape section 505 that contains the speech that corresponds to Ti. The size can be obtained estimating for each word Wr in Ti the maximum possible size Dr of its corresponding audio data on the tape, and taking the sum of all Dr (r=1,2 . . . ) in a segment as the length of a segment in the tape.

This information is transferred to the block 502 where the following tasks are performed. The end of the audio segment on the tape that corresponds to the previous T(i−1) text (or the beginning of the tape for the first T1 segment) is identified. The next segment of the tape with length that is provided from the block 501 is played automatic speech recognizer 506. The automatic speech recognizer decodes this audio data using the vocabulary that was provided from the block 501. The automatic speech recognizer sends each decoded series of words W1,W2, . . . Wk to the block 501 and compares it with the text Ti. If the decoded series of words matches well with the corresponding part V1 V2, . .

. V1 in Ti, then the next word V(1+1) is added to the list of alternative words the automatic speech recognizer is processing in decoding the corresponding segment of audio data. (This candidate word V(1+1) could be given with an additional score that represents the likelihood of being the next word in the considered path). After the whole text Ti is decoded, the end of the tape audio data that corresponds to the end of the text is defined. This end of the audio segment is transferred to the next step (decoding of T(i+1)) part of the text if Ti is not the last segment in T.

We claim:

1. An apparatus for indexing an audio recording comprising:

an acoustic recorder for storing an ordered series of acoustic information signal units representing sounds generated from spoken words, said acoustic recorder having a plurality of recording locations, each recording location storing at least one acoustic information signal unit;

a timer connected to said acoustic recorder for time stamping said acoustic information signal units;

a speech recognizer connected to said acoustic recorder for generating an ordered series of recognized words having a high conditional probability of occurrence given the occurrence of the sounds represented by the acoustic information signal units from said acoustic recorder, each recognized word corresponding to at least one acoustic information signal unit and comprising a series of one or more characters, each recognized word having a context of at least one preceding or following recognized word;

a time alignment device connected to said speech recognizer and receiving time stamps of said acoustic information signal units for aligning said acoustic information signal units according to respective time stamps of said acoustic information signal units;

a text storage device for storing a transcript of text of the spoken words corresponding to ordered series of acoustic information signal units stored on said acoustic recorder;

mapping means connected to said text storage device for determining a size of an acoustic information signal unit to be passed to said speech recognizer from said acoustic recorder, said mapping means generating an ordered series of index words, said ordered series of index words comprising a representation of at least some of the spoken words represented by the acoustic information signal units, each index word having a context of at least one preceding or following index word and comprising a series of one or more characters;

a segmenter controlled by said mapping means for controlling playback of acoustic information signal units to said speech recognizer; and alignment means connected to said acoustic recorder and to said mapping means for comparing the ordered series of recognized words with the ordered series of index words to pair recognized words and index words which are the same word and which have matching contexts, a recognized word being the same as an index word when both words comprise the same series of characters, a context of a target recognized word comprises the number of other recognized words preceding and following the target recognized word in the ordered series of recognized words, a context of a larger index word comprises the number of other index words preceding and following the target index word in the ordered series of index words, and the context of a recognized word matches the context of an index word if the context of the target recognized word is within a selected threshold value of the context of the target index word, said alignment means tagging each paired index word with the recording location of the acoustic information signal unit corresponding to the recognized word paired with the index word.

2. An apparatus as claimed in claim 1, wherein:

each index word which is not paired with a recognized word has a nearest preceding paired index word in the ordered series of index words, and has a nearest following paired index word in the ordered series of index words; and the comparing means tags a non-paired index word with a recording location between the recording location of the nearest preceding paired index word and the recording location of the nearest following paired index word.

3. An apparatus as claimed in claim 2, wherein the speech recognizer aligns each recognized word with at least one acoustic information signal unit.

4. An apparatus as claimed in claim 3, wherein:

each recognized word which is not paired with an index word has a nearest preceding paired recognized word in the ordered series of recognized words, and has a nearest following paired recognized word in the ordered series of recognized words;

the context of a target recognized word comprises the number of other recognized words preceding the target recognized word and following the nearest preceding paired recognized word in the ordered series of recognized words;

the context of a target index word comprises the number of other index words preceding the target index word and following the nearest preceding paired index word in the ordered series of index words; and the context of a recognized word matches the context of an index word if the context of the target recognized word is within a selected threshold value of the context of the target index word.

5. A method of indexing an audio recording comprising:

storing in an acoustic recorder an ordered series of acoustic information signal units representing sounds generated from spoken words, said acoustic recorder having a plurality of recording locations, each recording location storing at least one acoustic information signal unit;

time stamping said acoustic information signal units;

generating by a speech recognizer an ordered series of recognized words having a high conditional probability of occurrence given the occurrence of the sounds represented by the acoustic information signal units from said acoustic recorder, each recognized word corresponding to at least one acoustic information signal unit and comprising a series of one or more characters, each recognized word having a context of at least one preceding or following recognized word;

time aligning said acoustic information signal units according to respective time stamps of said acoustic information signal units;

storing a transcript of text of the spoken words corresponding to ordered series of acoustic information signal units on said acoustic recorder;

mapping the transcript of text to determine a size of an acoustic information signal unit to be passed to said speech recognizer from said acoustic recorder;

generating an ordered series of index words, said ordered series of index words comprising a representation of at least some of the spoken words represented by the acoustic information signal units, each index word having a context of at least one preceding or following index word and comprising a series of one or more characters;

segmenting said ordered series of index words to control playback of acoustic information signal units by said acoustic recorder;

comparing the ordered series of recognized words with the ordered series of index words to pair recognized words and index words which are the same word and which have matching contexts, a recognized word being the same as an index word when both words comprise the same series of characters, a context of a target recognized word comprises the number of other recognized words preceding and following the target recognized word in the ordered series of recognized words, a context of a target index word comprises the number of other index words preceding and following the target index word in the ordered series of index words, and the context of a recognized word matches the context of an index word if the context of the target recognized word is within a selected threshold value of the context of the target index word; and tagging each paired index word with the recording location of the acoustic information signal unit corresponding to the recognized word paired with the index word.

6. A method as claimed in claim 5, wherein:

each index word which is not paired with a recognized word has a nearest preceding paired index word in the ordered series of index words, and has a nearest following paired index word in the ordered series of index words; and the step of tagging comprises tagging a non-paired index word with a recording location between the recording location of the nearest preceding paired index word and the recording location of the nearest following paired index word.

7. A method as claimed in claim 6, further comprising the step of aligning each recognized word with at least one acoustic information signal unit.

8. A method as claimed in claim 7, wherein:

each recognized word which is not paired with an index word has a nearest preceding paired recognized word in the ordered series of recognized words, and has a nearest following paired recognized word in the ordered series of recognized words;

the context of a target recognized word comprises the number of other recognized words preceding the target recognized word and following the nearest preceding paired recognized word in the ordered series of recognized words;

the context of a target index word comprises the number of other index words preceding the target index word and following the nearest preceding paired index word in the ordered series of index words; and the context of a recognized word matches the context of an index word if the context of the target recognized word is within a selected threshold value of the context of the target index word.

* * * * *